United States Patent [19]

Peters et al.

[11] 4,006,800
[45] Feb. 8, 1977

[54] LEVER ACTUATED BRAKE ASSEMBLY

[76] Inventors: Jack Peters, 24008 Bessemer St.,
Woodland Hills, Calif. 91364;
DeLoris Joan Barrett, 6206 Satsuma
Ave., North Hollywood, Calif.
91606

[22] Filed: Mar. 15, 1976

[21] Appl. No.: 666,542

Related U.S. Application Data

[63] Continuation-in-part of Ser. No. 486,704, July 8, 1974, Pat. No. 3,945,472.

[52] U.S. Cl. ................................ 188/72.7; 74/110; 188/72.9; 192/70.23; 192/93 R; 192/99 S
[51] Int. Cl.² ...................................... F16D 55/228
[58] Field of Search ............ 188/22, 59, 72.7, 72.9; 192/99 A, 99 S, 93 R, 70.23, 70.24; 74/110

[56] References Cited
UNITED STATES PATENTS

| | | | |
|---|---|---|---|
| 2,365,369 | 12/1944 | Williams | 188/72.7 |
| 2,855,074 | 10/1958 | Casey | 188/72.7 |
| 2,987,142 | 6/1961 | Gracie, Jr. | 188/72.9 X |

Primary Examiner—George E. A. Halvosa
Attorney, Agent, or Firm—Pollock, Vande Sande & Priddy

[57] ABSTRACT

A brake assembly is disclosed in which a first pivoted lever receives and transmits brake actuating force to a second pivoted lever via tapered rollers. As the first lever is pivoted, a force is transmitted from a point which moves along the first lever to a point which moves along the length of the second lever so as to provide an increase in the mechanical advantage of both levers. In addition, the point of force application moves along the axis of each tapered roller to increase the rate at which the second lever moves to apply the braking force.

9 Claims, 7 Drawing Figures

LEVER ACTUATED BRAKE ASSEMBLY

CROSS REFERENCE TO RELATED APPLICATIONS

This application is a continuation-in-part of copending applicaton Ser. No. 486,704, filed July 8, 1974 now U.S. Pat. No. 3,945,472.

The invention disclosed in this application is especially adapted for use with hand truck assemblies such as disclosed in application Ser. No. 299,568 filed Oct. 20, 1972 by Jack Peters and Easton D. New, now U.S. Pat. No. 3,811,633, and Ser. No. 486,942, filed July 8, 1974, by Jack Peters and D. J. Barrett, now U.S. Pat. No. 3,941,399.

SUMMARY OF THE INVENTION

The prior art discloses many types of brake apparatus which are designed to slow and stop the movement of an adjacent rotor or wheel. Due to the large amount of force required to stop rotors moving at high speeds or carrying large weights having a high momentum tending to maintain movement of the rotor or wheel, it has frequently been necessary to provide electrical or hydraulic power actuators for prior art braking systems. This is because many manually actuated mechanical systems require the operator to apply such large actuation forces that adequate brake application may not be possible for some individuals.

The brake apparatus disclosed in this application is of the general type wherein a caliper assembly is caused to grip the moving periphery of a rotor or wheel to be stopped. A simple mechanical assembly is disclosed which will stop a rotor or wheel having great momentum force tending to maintain its rotation and restrain the wheel from further movement, with a minimum amount of force required to be applied by the operator.

An object of the invention is to provide a brake assembly which may be quickly actuated with ease by hand, without requiring the use of power assist devices. A further object is to provide a brake in which the only adjustments to be made are for shoe wear during use. Yet another object is to provide a brake assembly suited for use on hand trucks, which may be locked to hold the hand truck on a grade. Still another object is to provide such a brake which is especially suited for use on bicycles.

To these ends, the invention includes a brake shoe having a plurality of cooperating actuating levers to provide an increasing mechanical advantage for the operator as the brakes are applied. Direct mechanical interconnection minimizes wear effects and permits locking of the brake when desired.

DESCRIPTION OF THE PREFERRED EMBODIMENT

Figure 1:
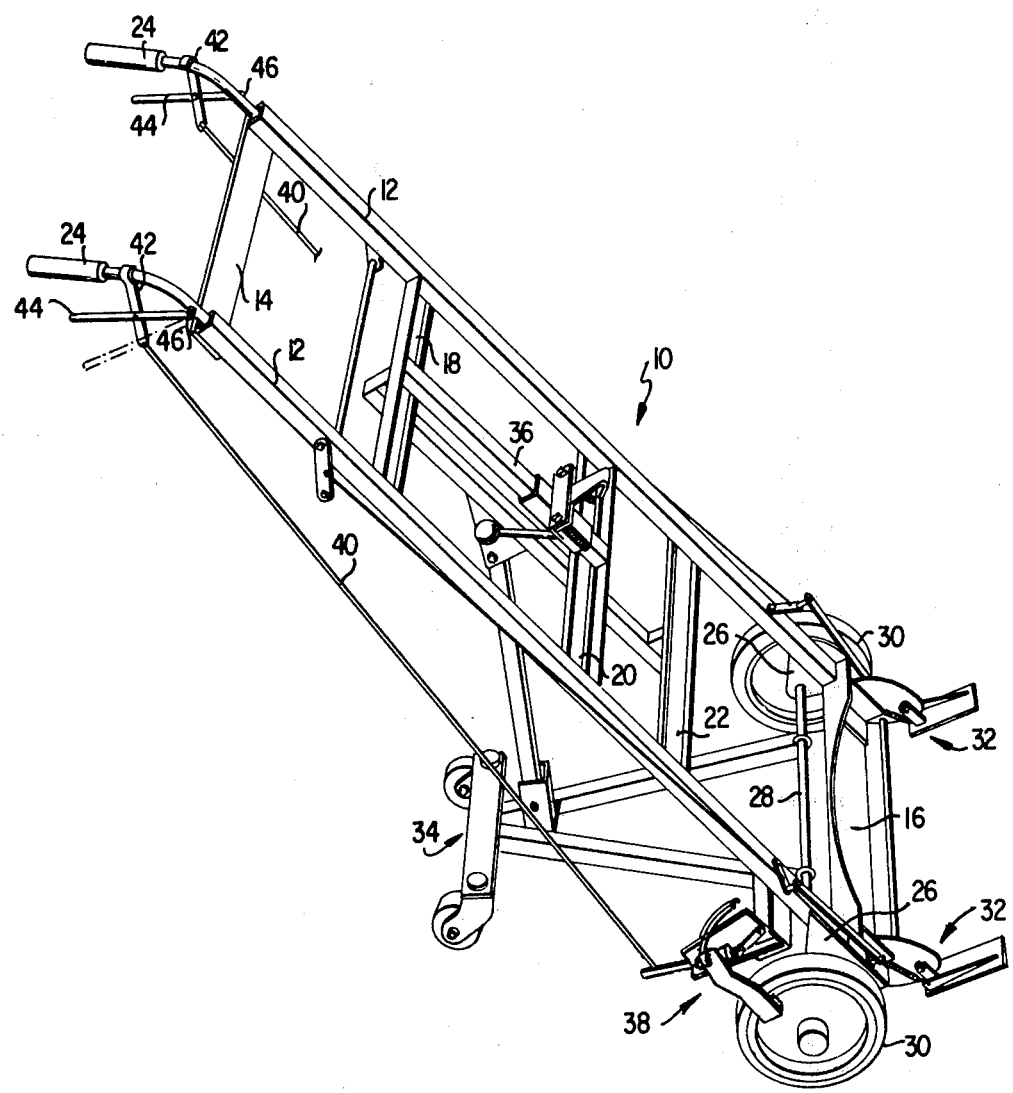
FIG. 1 shows a perspective view taken from above a hand truck assembly embodying the brake apparatus of this invention, generally designated at element 38.

There follows a detailed description of a preferred embodiment of the invention, reference being had to the drawings in which like reference numerals indicate like elements of structure in each of the several Figures.

The brake assembly of the invention is suitable for use in a wide variety of applications where a wheel or rotor is to be slowed and stopped; however, for purposes of illustration, its use is illustrated in FIG. 1 in association with a hand truck of the type disclosed in applicants' U.S. Pat. No. 3,941,399. The hand truck comprises an elongated frame 10 made up of side rails 12 which are joined at the upper and lower ends by lateral brace plates 14 and 16 and further braced by upper, middle and lower lateral brace beams 18, 20 and 22. Handles 24 are attached to the upper ends of side rails 12 for convenience of the operator. At the lower end of the elongated frame 10, axle support legs 26 are attached, between which extends axle 28, having wheels 30 mounted on the outboard ends thereof. Selectively adjustable load bearing shoe plate assemblies 32 are affixed to the lower end of elongated frame 10 on the side opposite from axle support legs 26, as fully described in application Ser. No. 486,942. An auxiliary support wheel assembly 34 may also be affixed to the elongated frame 10 as described more fully in U.S. Pat. No. 3,811,633. Barrel hook assembly 36 permits restraint of the upper lip or surface of a barrel or other article to be carried. The lever actuated brake assembly of the invention is indicated generally by reference numeral 38 and is actuated by lever 40 which, in turn, is pivotably attached to brake locking hook 42 which is pivotably actuated by hand lever 44, located adjacent handles 24. Generally, it is desirable to place the brake assemblies 38 in position to cooperate with each of wheels 30.

Figure 2:
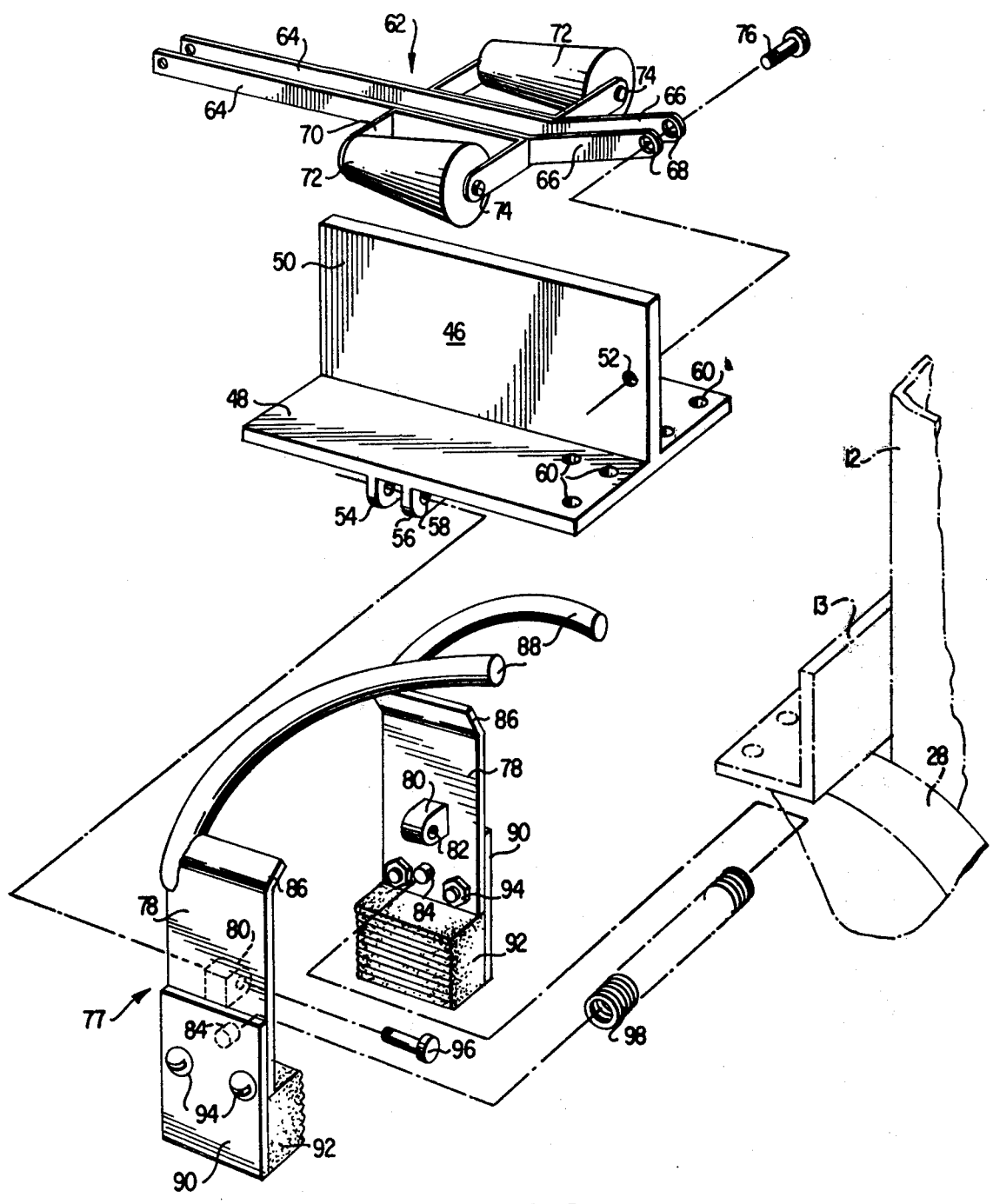
FIG. 2 shows an exploded perspective view of a brake assembly according to the invention, including a phantom illustration of its attachment to a hand truck such as shown in FIG. 1.

FIG. 2 shows the various component parts of the brake assembly according to the invention. Side rail 12, brake attachment flange 13 and wheel 28 are shown partially in phantom to illustrate one actual application of the invention. A T-shaped frame 46 is used as the basic mounting frame for the brake assembly and includes an essentially rectangular base plate 48 and an integral upstanding plate 50. A through bore 52 is provided near the mid-point of upstanding plate 50 at one end thereof for attachment of the brake roller levers 62. At approximately the mid-portion of the under surface of base plate 48 are attached brake arm support flanges 54 and 56 which extend across the under surface of base plate 48 (see FIG. 4). Brake arm support flanges 54 and 56 include through bores 58 for mounting the brake lever assemblies 77. Bores 60 are provided in the base plate 48 as necessary for attachment to support flange 13.

Brake roller levers 62 include straight segments 64 of conventional bar stock and upwardly bent segments 66 having bores 68 therein for pivotal attachment to upstanding plate 50 at bore 52. Roller brackets 70 extend laterally of straight segments 64 as shown and are suitably apertured to receive tapered rollers 72 mounted on axles 74. A conical roller 72 is illustrated. Pivot bolt 76 provides connection between brake roller levers 62 and upstanding plate 50 at bore 52.

Brake lever assemblies 77 include brake arms 78 which are essentially rectangular segments of bar stock having attachment bosses 80 including bores 82 affixed to the inner surfaces thereof. Spring retainer bosses 84 are affixed to brake arms 78 below attachment bosses 80. At the upper ends of brake arms 78 are located inwardly bent portions 86 which are deflected from the plane of brake arms 78 approximately 60°. Attached to inwardly bent portions 86 are brake arm extensions 88 which are illustrated as being made from round bar stock and preferably are bent within a plane including inwardly bent portions 86 into a circular arc, extending toward the pivot bolt 76 and away from boss 80 and having sufficient length to permit contact with rollers 72 throughout the entire range of motion of brake roller levers 62. In practice, it has been found convenient to use a radius for this arc equivalent to the distance between the center line of bore 52 and the initial point of contact between brake arm extension 88 and roller 72, as indicated at "R" in FIG. 3. Those skilled in the art will realize that the angulation of bent portions 86 and brake arms extensions 88 may be increased to increase the movement of brake arms 78 for a given rotation of roller levers 62, and vice versa, without departing from the scope of the invention. At the lower end of brake arms 78 are attached brake shoe plates 90 and shoe pads 92, using suitable fasteners such as screws or rivets, indicated at 94. A pivot bolt 96 secures bosses 80 between brake arm support flanges 54 and 56. A bias spring 98 is located between brake arms 88 in engagement with retainer bosses 84 and serves to bias the assembly out of contact with the adjacent wheel.

Figure 3:
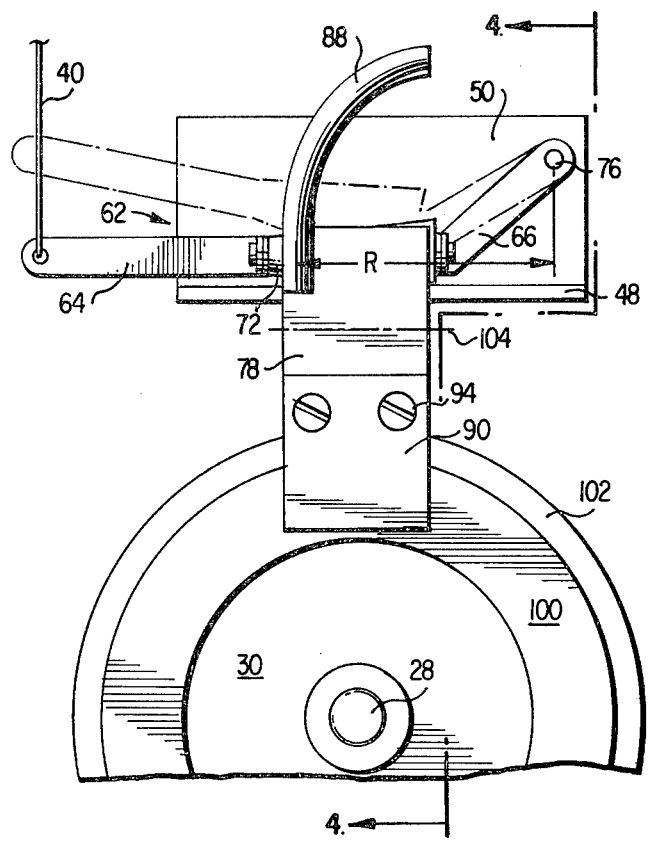
FIG. 3 shows a side elevation view of the invention, indicating its relative orientation to the rotor or wheel to be slowed or stopped and showing in phantom successive positions the brake actuating lever.

FIG. 3 shows a side view of the assembly indicating in phantom a second position of brake roller levers 62. As may be seen from the phantom position of levers 62, the point of contact between tapered rollers 72 and brake arm extensions 88 moves along tapered rollers 72 toward pivot bolt 76 as levers 62 are raised in response to force supplied via cable 40. The point of contact on extension 88 also moves further from pivot axis 104 of brake arm 78.

Figure 4:
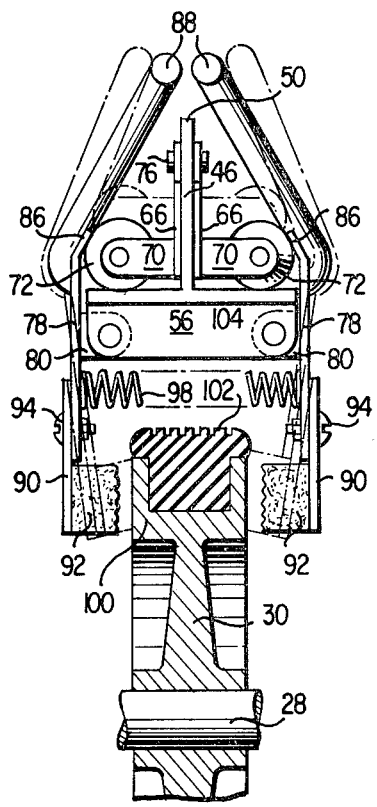
FIG. 4 shows a front elevation view of the invention, partially in section, taken along line 4—4 of FIG. 3.

FIG. 4 shows a view, partially in section taken along line 4—4 of FIG. 3, indicating the mode of engagement between tapered rollers 72 and brake arm extensions 88 and between brake shoe pads 92 and wheel rim 100. Tapered rollers 72 are an improvement upon the cylindrical rollers shown in our copending application Ser. No. 486,704. As levers 62 are raised, brake arm extensions 88 contact tapered rollers 72 at progressively increasing radius, relative to the roller axis and to levers 62. For a given rotation of roller levers 62, this causes brake lever assembly 77 to pivot more quickly into contact with the wheel than would be the case with cylindrical rollers. Thus, a shorter movement of levers 62 is required to apply the brake than would be the case with cylindrical rollers. The progressive movement of brake arm extensions 88 and brake shoe pads 92 is indicated in phantom as brake roller levers 62 are rotated. Although the brake shoe pads 92 are shown contacting the metal rim 100 of wheel 30, it will be apparent that such pads may also be applied directly to the side walls of tire 102.

Figure 5:
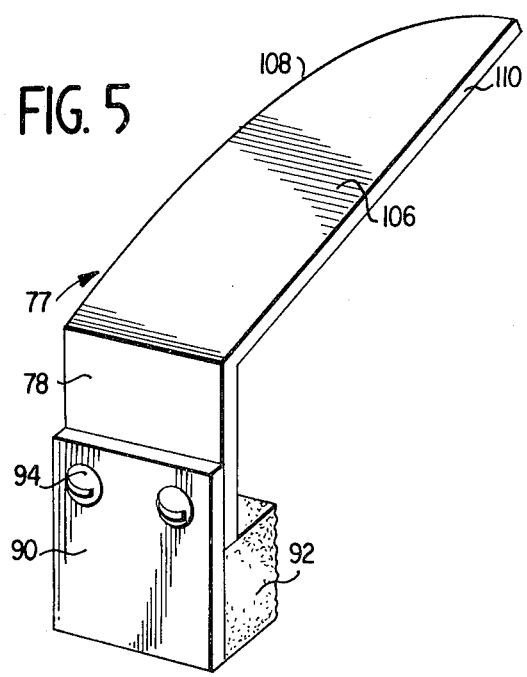
FIG. 5 shows an alternate form of the brake arm of the invention.

FIG. 5 shows an alternative embodiment of brake lever assemblies 77 in which the brake arm extensions 88 and the inwardly bent portions 86 have been replaced by an inwardly bent portion 106 integral with the upper end of brake arms 78. Inwardly bent portions 106 include a curved edge 108 which follows essentially the same circular arc as do brake arm estensions 88, discussed above, and extends from one side of brake arms 78 to join edge 110 extending from the other side of brake arms 78. Due to the changing contact line between inwardly bent portions 106 and tapered rollers 72 as brake roller levers 62 are raised, the effective contact point between the two moves closer to the pivot point of brake roller levers 62 and further from the pivot axis 104 of brake lever assemblies 77.

Figure 6A:
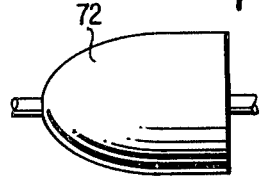
FIGS. 6A and 6B show alternate forms of the actuating rollers of the invention.
Figure 6B:
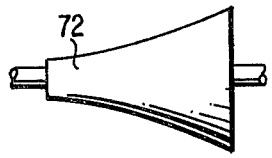

FIGS. 6A and 6B show alternative types of tapered rollers 72 which may be used in place of the conical rollers illustrated in FIG. 2. In FIG. 6A, the radius of the roller increases more quickly than in a conical roller. In FIG. 6B, the radius of the roller increases more slowly than in a conical roller. In general, tapered rollers having a radius which increases from the brake release position to the brake application position are within the scope of this invention. Alternatively, tapered rollers 72 could be replaced by tapered wedges attached directly to levers 62 in position to be contacted by brake arm extensions 88 or 106. Such wedges each provide a force transferring surface which varies in distance from each respective lever 62 as they pivot about bolt 76. In any event, those skilled in the art will appreciate that the tapered rollers or wedges constitute force applying means which are angled relative to their associated levers 62 for applying force to extensions 88 or 106 at a steadily increasing distance from levers 62 as levers 62 are rotated about pivot bolt 76.

In operation, the brake assembly is affixed in any suitable manner adjacent the rotor or wheel to be slowed and stopped as indicated generally in FIGS. 1, 3 and 4. When the motion of the rotor or the wheel is to be slowed or stopped, the operator causes brake roller levers 62 to be rotated about pivot bolt 76, thereby causing brake lever assemblies 77 to rotate about pivot axis 104, forcing brake shoe pads 92 to contact and stop wheel or rotor assembly 30. With reference to FIG. 1, an embodiment of a brake actuating linkage is shown, in which brake locking hooks 42 may be affixed over handles 24 as shown in order to secure the brake in its engaged position to hold the hand truck in a desired location. Of course, any type of mechanical actuating system may be used which will rotate brake roller levers 62 about pivot 76.

The unique geometry of the invention permits the brake to be applied quickly with a minimum of force applied to the end of straight segments 64 of brake roller levers 62. As levers 62 are pivoted about bolt 76, a mechanical advantage is provided as the point of force transferral between each lever 64 and the associated brake arm extension moves progressively closer to the pivot bolt. Concurrently, a further mechanical advantage is provided by reason of the progressive movement of the point of force transferral between the levers away from the pivot point of each brake lever assembly 77. In addition, as each lever 62 is pivoted, the point of force transferral moves along the tapered surface provided by a respective roller 72 so as to increase the rate of pivoting of each brake lever assembly to its brake application position. The superior mechanical advantage provided by the cooperating levers and rollers of the invention permits rapid actuation of the brake assembly with a minimum applicaton of force to brake roller levers 62. The simple structure of the invention is such that no brake adjustment is required, other than pad replacement.

Having described our invention in such detail as to enable one skilled in the art to make and use it, we claim:

1. A brake apparatus, comprising:
    a first pivoted lever;
    means for transferring force from said first pivoted lever at a steadily increasing distance from said first pivoted lever as said brake apparatus is applied;
    at least one pivoted brake lever;
    at least one brake shoe supported by said at least one pivoted brake lever;
    means responsive to the pivoting of said first pivoted lever for applying a force from a first point which moves relative to the pivot of said first pivoted lever in a direction to increase the mechanical advantage of said first pivoted lever, to a second point which moves relative to the pivot of said at least one pivoted brake lever to concurrently increase the mechanical advantage of said at least one pivoted brake lever, whereby pivoting said first pivoted lever to apply braking force produces a continuous change in the effective length of both levers and a continuous increase in the mechanical advantage of both said first pivoted lever and said at least one pivoted brake lever.

2. The brake apparatus of claim 1 which further includes:
    a second pivoted lever;
    means for transferring force from said second pivoted lever at a steadily increasing distance from said second pivoted lever as said brake apparatus is applied;
    a second pivoted brake lever;
    a second brake shoe positioned on said second pivoted brake lever; and
    means responsive to the pivoting of said second pivoted lever for applying a force from a third point which moves relative to the pivot of said second pivoted lever in a direction to increase the mechanical advantage of said second pivoted lever, to a fourth point which moves relative to the pivot of said second pivoted brake lever to concurrently increase the mechanical advantage of said second pivoted brake lever.

3. A brake apparatus as in claim 2, wherein each of said transferring means comprises tapered rollers rotatably mounted on said first and second pivoted levers and respectively contacting one of said applying means as the first and second pivoted levers are pivoted.

4. A brake apparatus as in claim 2, wherein said applying means comprise respective extensions of said pivoted brake levers positioned to be contacted respectively by said transferring means as said first and second pivoted levers are pivoted, said extensions being shaped to protrude from said pivoted brake levers along respective paths toward the pivots of the first and second pivoted levers and away from the pivots of said pivoted brake levers, respectively.

5. The brake apparatus of claim 1 which further includes means for applying a brake actuating force to said first pivoted lever at a predetermined location thereon, said transferring means being located intermediate the pivot of said first pivoted lever and said predetermined location, for applying force to said at least one pivoted brake lever,
    said at least one pivoted brake lever supporting adjacent one end thereof said at least one brake shoe and having said applying means located adjacent its opposite end, the pivot of said at least one pivoted brake lever being positioned intermediate the ends of said at least one pivoted brake lever.

6. A brake apparatus as in claim 1, wherein said applying means comprises a portion of said at least one pivoted brake lever positioned to be contacted by said transferring means as said first pivoted lever if pivoted, said portion being shaped to extend from said at least one pivoted brake lever along a path toward the pivot of said first pivoted lever and away from the pivot of said at least one pivoted brake lever.

7. A brake apparatus as in claim 6, wherein said transferring means comprises tapered roller means rotatably mounted on said first pivoted lever for contacting said portion of said at least one pivoted brake lever as said first pivoted lever is pivoted.

8. A brake apparatus as claimed in claim 6, wherein said portion of said at least one pivoted brake lever is curved in an arc, the arc extending toward the pivot of said first pivoted lever and away from the pivot of said pivoted brake lever and having sufficient length to permit contact with said transferring means throughout the range of motion of said first pivoted lever.

9. A brake apparatus as in claim 1, further comprising means for biasing said at least one brake shoe out of contact with an element to be braked.

* * * * *